United States Patent [19]

Bowers et al.

[11] 4,418,911

[45] Dec. 6, 1983

[54] VIDEO GAME PLATFORM PROVIDING SPATIAL DISORIENTATION

[76] Inventors: John B. Bowers, 126 Vine St., Chesterfield, Ind. 46017; Rex A. Bowers, 2234 Urban-Dale, Shreveport, La. 71118

[21] Appl. No.: 313,056

[22] Filed: Oct. 19, 1981

[51] Int. Cl.³ .......................... A63G 9/18; G09B 9/08
[52] U.S. Cl. .................. 273/85 G; 272/1 C; 434/55; 273/DIG. 28
[58] Field of Search .............. 272/30, 44, 31 A, 31 B, 272/1 C, 35, 144, 146, 50; 434/38, 43, 45, 46, 55–59, 62, 67, 69, 34, 29, 30; 46/1 B; 248/582, 583; 273/DIG. 28

[56] References Cited

U.S. PATENT DOCUMENTS

| | | | |
|---|---|---|---|
| 2,517,324 | 8/1950 | Kurose | 272/35 |
| 3,078,093 | 2/1963 | Hotkins et al. | 434/69 |
| 3,436,841 | 4/1969 | Whitmore et al. | 434/34 |
| 3,830,491 | 8/1974 | Christians | 272/33 R |
| 4,164,080 | 8/1979 | Kosyder et al. | 434/38 |

FOREIGN PATENT DOCUMENTS 3001768 7/1981 Fed. Rep. of Germany ... 273/DIG. 28

Primary Examiner—Vance Y. Hum
Assistant Examiner—MaryAnn Stoll
Attorney, Agent, or Firm—John H. Calhoun, Jr.

[57] ABSTRACT

A motor-driven, cam-operated, rod-supported swingable platform for providing horizontal and vertical movement to video games and their users, comprising a rectangular support frame having mounted at each corner thereof a vertical post from which a suspension rod is swingably attached at one end. The other end of each suspension rod is swingably attached to a corner of a rectangular platform upon which are mounted a video game and an operator's seat. A cam follower is provided on the bottom of the platform, and the cam follower is driven by a cam that is attached to one end of a drive arm that is attached at its other end to the shaft of a vertically positioned electric motor. Operation of the motor causes the platform to swing on its four suspension rods thereby giving a sense of motion and pleasure to persons who operate the video game while seated in the operator's seat on the platform.

1 Claim, 8 Drawing Figures

VIDEO GAME PLATFORM PROVIDING SPATIAL DISORIENTATION

BACKGROUND OF THE INVENTION

Video games are relatively new entertainment devices that employ microelectronic components and programmable computer-like systems to provide a range of dynamic interaction between a user and a game device. Users operate switches, knobs, wheels, levers, pedals, buttons and other terminal controls in response to stimuli most often presented on the face of a TV-like cathode ray tube. A wide variety of games are available such as games for playing cards, for simulating sports events, and for conducting mock battles. Heretofore, video games have been placed for use on stable platforms, most often the floors of arcades, stores and other establishments. It has been discovered however that user involvement and pleasure are greatly increased for certain of the video games such, for example, as games that involve mock aerial battles, by placing the game apparatus and the user on a moveable platform and introducing the element of motion during play of the game.

U.S. Pat. No. 2,373,313 issued on Apr. 10, 1945 to H. T. Jeandron shows a synthetic flying trainer apparatus for simulating actual flight through optical illusion. U.S. Pat. No. 2,409,938 issued on Oct. 22, 1946 to W. H. Hunter shows a pilot trainer apparatus adapted to move a student pilot about an axis of rotation in such manner that he experiences substantially the same sensation as would be encountered in an airplane in which the controls where similarily moved. U.S. Pat. No. 2,514,762 issued on July 11, 1950 to S. I. Hayes, et. al. shows main and auxiliary control valve arrangements for grounded pilot trainers mounted for producing pitching, banking, and turning movements to simulate the turning, pitching, and banking of an airplane in actual flight. U.S. Pat. No. 2,524,238 issued on Oct. 3, 1950 to C. W. Soulé shows a flight trainer for student pilots adapted to imitate and produce all the movements of an airplane in flight by proper minipulation of a combination of control members arranged adjacent to a chair or seat. U.S. Pat. No. 2,526,371 issued on Oct. 17, 1950 to G. Laughead, et al. shows an airplane flight instruction device primarily for use by children in which a small model airplane having fixed control surfaces is flexibly suspended in front of an electric fan which imparts lift to the air foil surfaces of the airplane while a user maneuvers the airplane by a manual control system. U.S. Pat. No. 2,721,740 issued on Oct. 25, 1955 to J. J. Skelley shows a rotating support for an automobile and involves a teeter-totter-like balancing device, adapted to support a motor vehicle on the top thereof. U.S. Pat. No. 2,962,283 issued on Nov. 29, 1960 to A. P. Casey shows an occupant operated acquatic toy. U.S. Pat. No. 2,661,954 issued on Dec. 8, 1953 to J. C. Koci shows an amusement and target practicing device in which a moveable cockpit is aimed at target elements on a board by manipulation of a control member adjacent to a seat within the moveable cockpit.

SUMMARY OF THE INVENTION

The swingable platform of the present invention is unlike any of the platforms known in the prior art, and is uniquely adapted for use with video games and provides several distinct and important advantages when employed as a video game platform. One object of the present invention is to provide a swingable platform to impart motion to a video game and to its user. Another object of the present invention is to provide an apparatus capable of vertical movement and of 360° horizontal movement about an axis. Another object of the present invention is to provide a platform that will safely support a video game and its user so that the user may experience the element of motion while playing the game. Another object of the present invention is to provide a platform that will not tilt over or collapse when in use. Another object of the present invention is to provide a platform that is simple in construction, inexpensive, strong and durable, reliable, and well adapted for the purposes for which it is designed. Other objects and advantages of the present invention will become apparent from a consideration of the following detailed description taken in connection with the accompanying drawings wherein a preferred embodiment of the invention is shown. It should be understood that the invention is not limited to the details disclosed, but includes all such variations and modifications as fall within the spirit of the invention and the scope of the appended claims.

The objectives of the present invention are accomplished by providing a motor-driven, cam-operated, rod-supported, swingable platform of novel construction comprising a stable rectangular frame assembly adapted to stand on a floor and having a vertical post mounted thereto at each corner thereof; four vertical posts mounted at the corners of the rectangular frame, each having a suspension rod support arm extending inward therefrom; four suspension rods, each swingably coupled at one end to one of the four suspension rod support arms and swingably coupled at the other end to a corner of a suspended rectangular platform having mounted thereon a video game device and an operator seat; a rectangular platform having a video game video device and an operator seat mounted thereon, and swingably suspended at it four corners from the four suspension rods; a cam follower fixed to the bottom of the platform; an electric motor vertically mounted to the frame below the platform and having attached to the shaft thereof one end of a drive arm that is attached at its other end to a cam adapted to drive the cam follower and thereby impart a combined swinging and rising and falling motion to the platform.

BRIEF DESCRIPTION OF THE DRAWINGS

A preferred embodiment of the present invention is illustrated in the accompanying drawings in which.

DESCRIPTION OF THE PREFERRED EMBODIMENT

Figure 1:
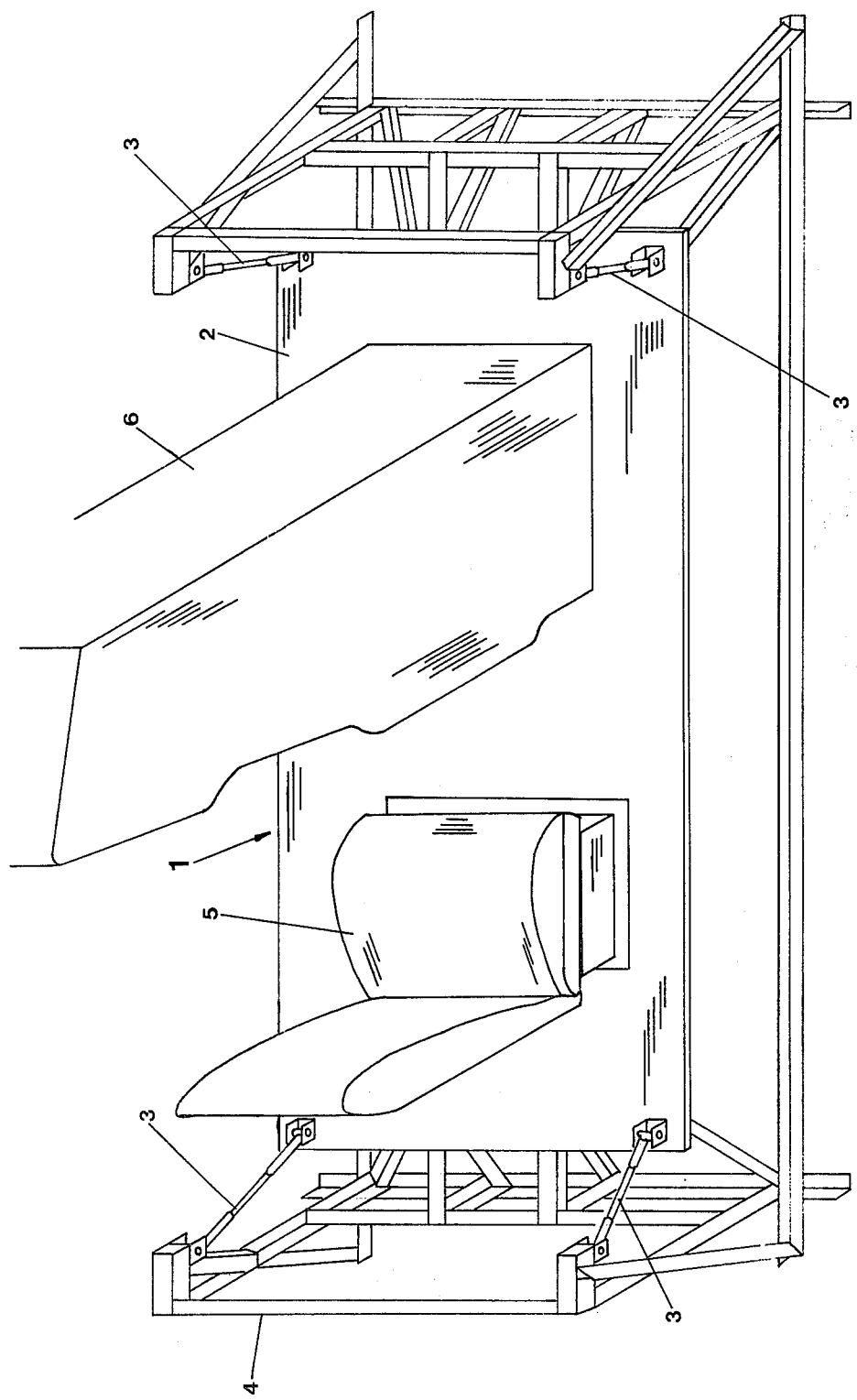
FIG. 1 is a top perspective view of the platform of the present invention.

Referring now to the drawings in greater detail, FIG. 1 illustrates a swingable platform apparatus of the present invention, shown generally at 1. The apparatus 1 comprises a rectangular flat platform 2 that is swingably supported by a plurality of suspension rods 3 from a support frame assembly 4 and having mounted thereon an operator's seat 5 and video game device 6.

Figure 2:
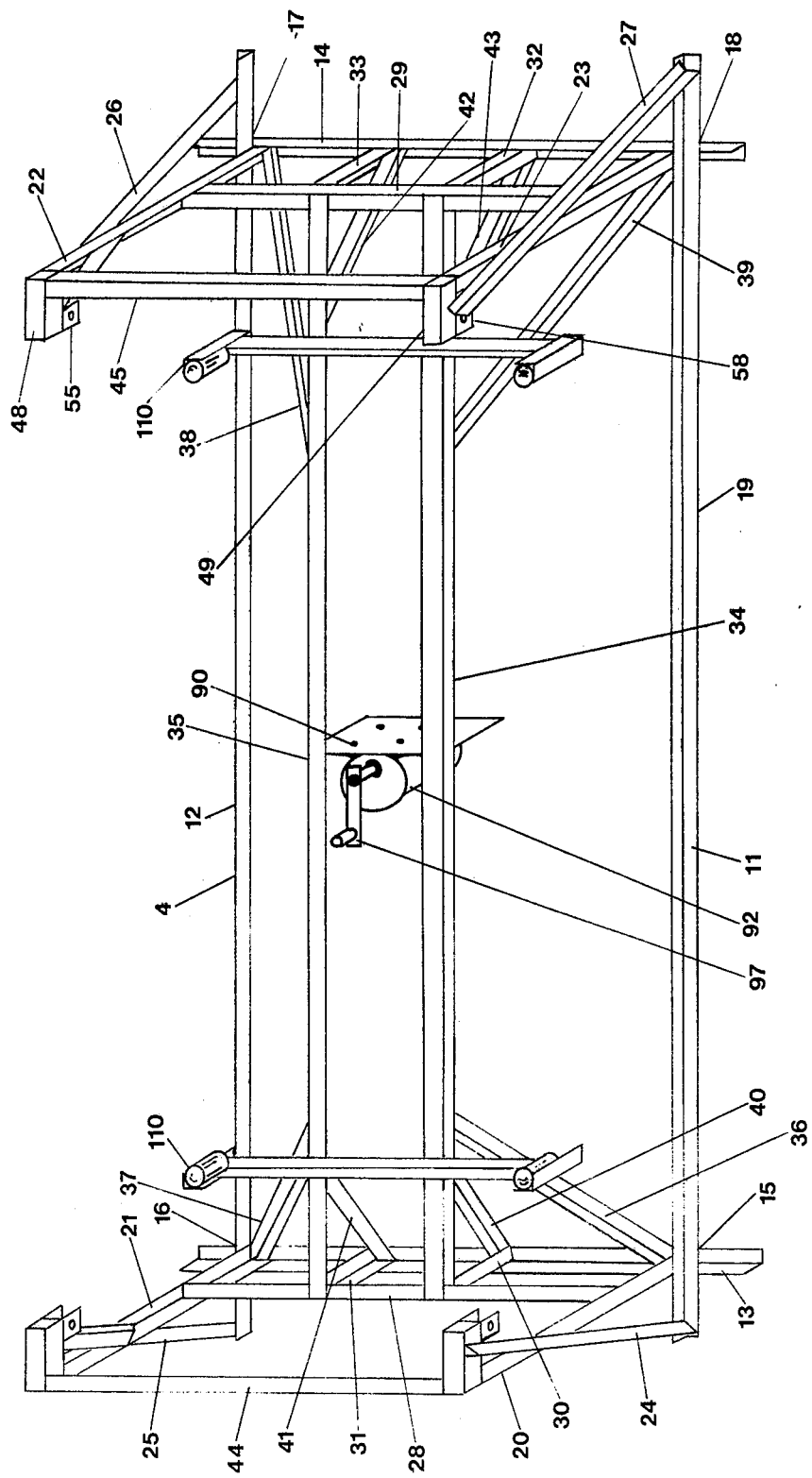
FIG. 2 is a top perspective view of a frame assembly of the present invention.

The support frame 4 is shown in greater detail in FIG. 2. The said frame 4 comprises a pair of parallel side rails 11, 12 and a pair of parallel end rails 13, 14 perpendicular to the said side rails 11, 12 and welded or otherwise suitably joined to the said side rails at the points of intersection 15, 16, 17, 18 therewith to form a rectangular frame base 19. The said side rails 11, 12 and end rails 13, 14 extend beyond their points of intersection 15, 16, 17, 18 to provide greater stability and to reduce any risk that the frame might overturn when the apparatus is in use. A vertical post 20, 21, 22, 23 is joined to the frame base 19 at each point 15, 16, 17, 18 of intersection between a side rail 11, 12 and an end rail 13, 14, and the rigidity of the structure is increased by providing a post brace 24, 25, 26, 27 joined to and extending between the upper end of each post 20, 21, 22, 23 and the extended end of a side rail 11, 12 adjacent thereto. A low end brace 28, 29 is provided above and parallel to each end rail 13, 14 and is joined by welding or other suitable means to the pair of vertical posts 20, 21, 22, 23 at each end of the frame 4. A pair of vertical support posts 30, 31, 32, 33 is provided at each end of the frame 4 and each post 30, 31, 32, 33 extends between and is joined by welding or other suitable means to an end rail 13, 14 and to the horizontal end brace 28, 29 adjacent thereto. A pair of raised and parallel motor mount rails 34, 35 extend above and lengthwise of the bottom frame base 19. Each of the said motor mount rails 34, 35 is welded or otherwise suitably joined at its ends to the two horizontal end braces 28, 29. Four external inclined braces 36, 37, 38, 39 and four internal inclined braces 40, 41, 42, 43 add strength and rigidity to the frame assembly 4. Each external inclined brace 36, 37, 38, 39 is joined by welding or other suitable means at one end to a side rail 11, 12 and at the other end to a motor mount rail 34, 35. Each interior inclined brace 40, 41, 42, 43 is joined in like manner at one end to an end rail 13, 14 and at its other end to a motor mount rail 34, 35. An upper end brace 44, 45 is provided above and parallel to each end rail 34, 35 at each end of the frame 4 and is joined by welding or other suitable means to the upper end of the pair of vertical posts 20, 21, 22, 23 located at each end of the frame 4. In a preferred embodiment of my invention I employ an all welded construction for the frame assembly 4 and I use commercially available steel angles for the side rails 11, 12, end rails 13, 14, vertical posts 20, 21, 22, 23, post brace 24, 25, 26, 27, low end braces 28, 29, vertical support posts 30, 31, 32, 33, motor mount rails 34, 35, external inclined braces 36, 37, 38, 39, internal inclined braces 40, 41, 42, 43, and upper end braces 44, 45. It will be readily seen that structural members other than steel angles and assembly methods other than welding may be employed within the spirit of the present invention and within the scope of the appended claims.

Figure 3:
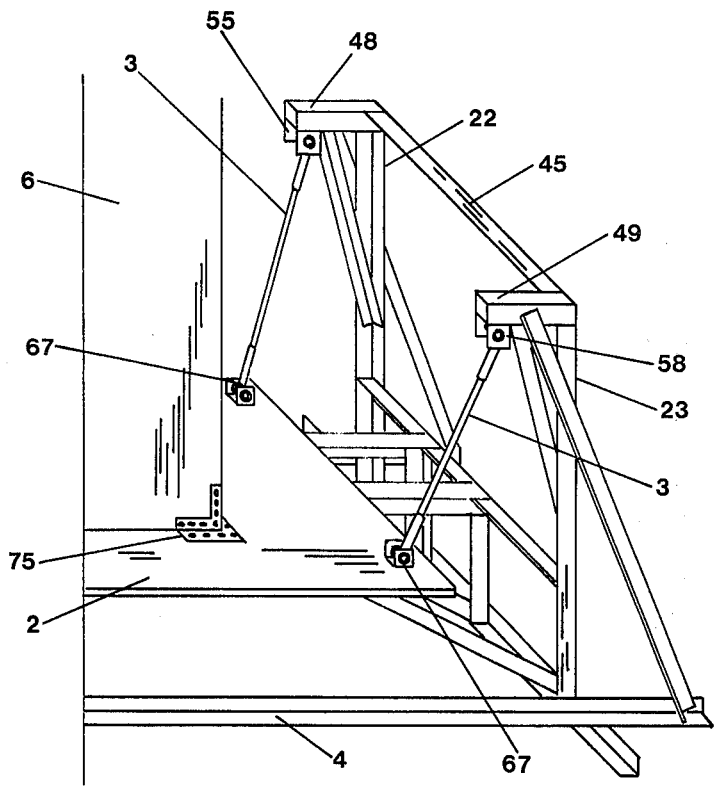
FIG. 3 is a detailed view in perspective of one end of the swingable platform of the present invention.

FIG. 3 illustrates one of two like ends of the swingable support apparatus of the present invention. Shown are a pair of vertical support posts 22, 23 at one end of the frame 4, each post having an inward extending rod support arm 48, 49 attached to the top thereof. A rod support bracket 55, 58 is attached to and depends from each support arm 48, 49. An end 61 of a flat platform 2 made of wood or other suitable materials is suspended from the rod support arms 48, 49 by a pair of like suspension rods 3. A video game apparatus 6 located on top of the platform 2 is held stationary on the platform 2 by brackets 75 attached to the platform 2.

Figure 4:
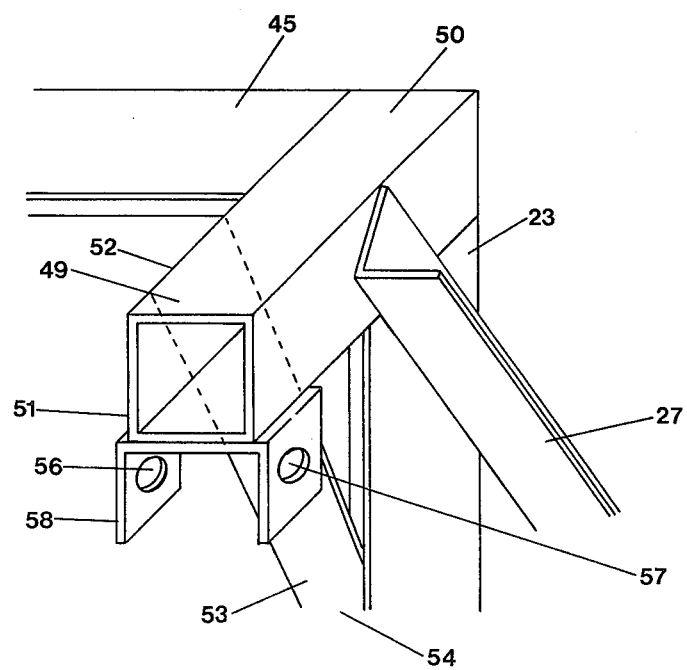
FIG. 4 is a view in perspective of a suspension rod support arm.

Shown in greater detail in FIG. 4 is a rod support arm 49 which, in the illustrated embodiment, comprises a rectangular pipe welded at one end 50 to the top of the adjacent vertical support post 23 and upper end brace 45. A post brace 27 and one end 52 of an internal arm brace 53 comprising a steel plate are welded to the exterior vertical surfaces of the said arm 49. The post brace 27 is welded to the adjacent vertical post 23 and to the end of a side rail 11. The other end 54 of the internal brace 53 is also welded to the vertical post 23. The free end 51 of the rod support arm 49 has attached to and depending from the bottom thereof a downward opening channel-like rod support bracket 58 having bolt holes 56, 57 provided in the flanges thereof adapted for bolting a suspension rod 3 thereto.

Figure 5:
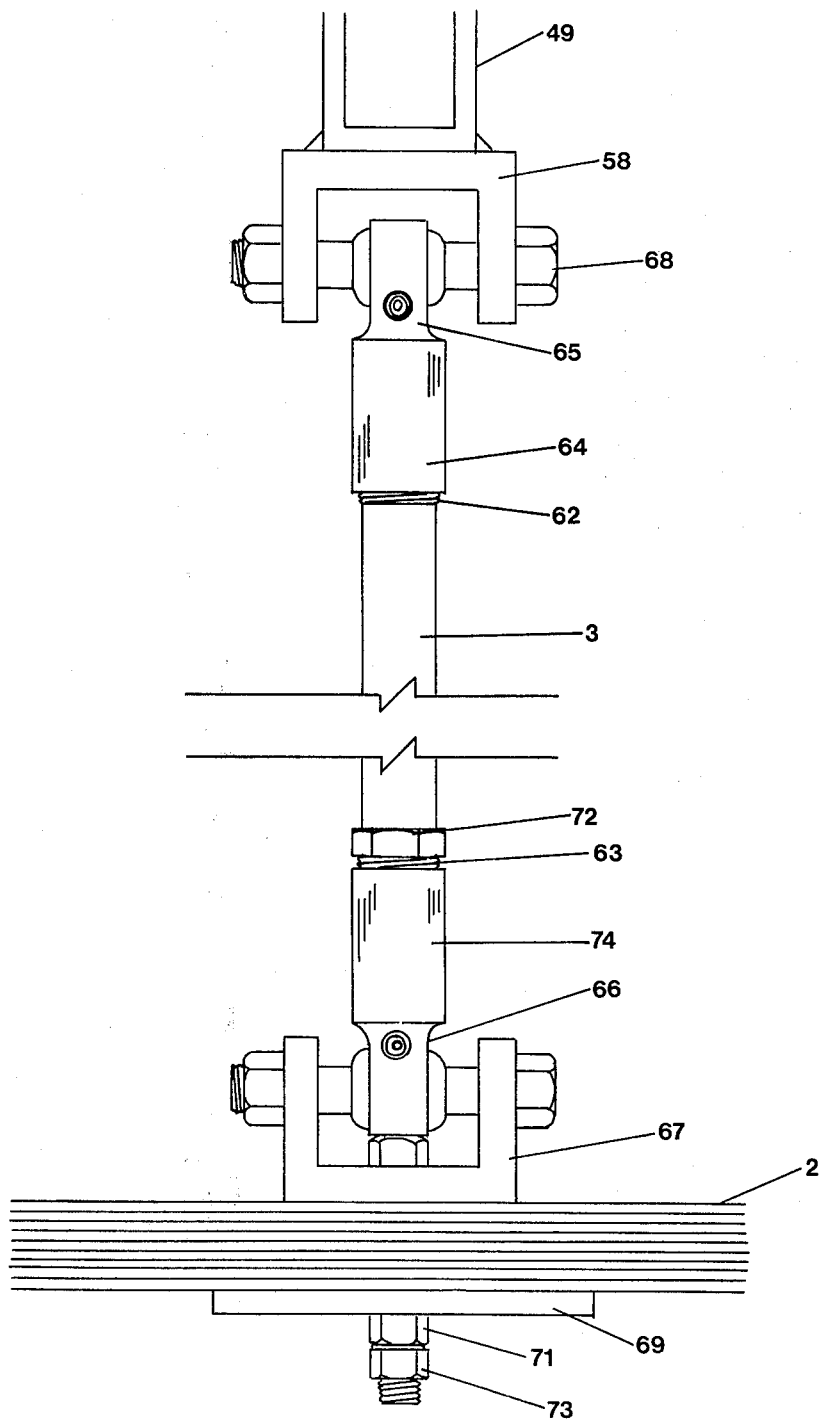
FIG. 5 is a front elevation view of a suspension rod assembly of the present invention.

FIG. 5 is a front elevation view of a suspension rod assembly showing a rod support arm 49, a rod support bracket 58 joined thereto, and a commonly available upper rod end 65 coupled to the rod support bracket 58 by a bolt 68. An upward opening channel-like platform bracket 67 is bolted to each corner of the platform 2 and a brace plate 69 is placed between the platform and the nut 71 to provide additional strength at the bolt connection. A lower rod end 66 is bolted to each platform bracket 67. One end 62 of each suspension rod 3 is provided with a plurality of right hand threads adapted for coupling the said rod 3 to an internally threaded barrel portion 64 of an upper rod end 65, and the other end 63 of each suspension rod 3 is provided with a plurality of left hand threads adapted for coupling each of the said rods 3 to an internally threaded barrel portion 74 of a lower rod end 66. As can be easily seen, a suspension rod 3 may be simultaneously coupled at both ends to upper and lower rod ends 65, 66 by turning the rod 3 about its longitudinal axis. Jam nuts 72, 73 prevent rotation of the suspension rod 3 and loosening of the nut 71.

Figure 6:
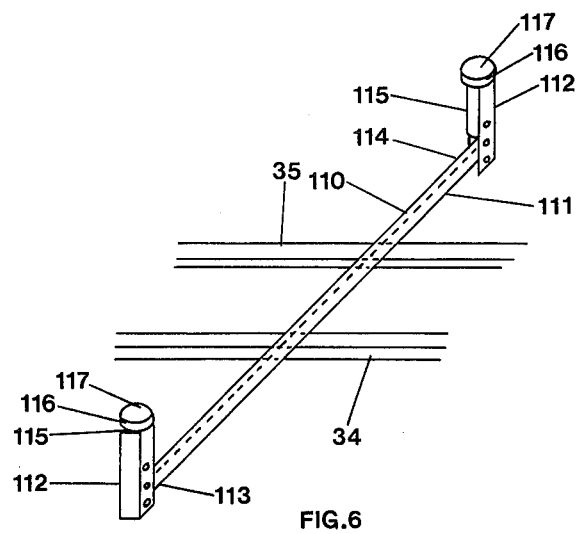
FIG. 6 is a view in perspective of a safety bar assembly.

In a preferred embodiment of my invention I provide a pair of like safety bar assemblies 110 mounted on and across the motor mount rails 34, 35 below the platform 2 to catch the platform 2 in the event that one or more suspension rods 3 should break. Illustrated in FIG. 6 is a safety bar assembly 110 comprising a bar 111 that extends across and beyond the motor mount rails 34, 35, and that is welded, bolted, or otherwise suitably jointed to the said rails 34, 35. A vertically positioned angle bracket 112 is attached to each end 113, 114 of the bar 111; an internally threaded vertical pipe 115 is welded or otherwise joined to each angle bracket 112, and a threaded pipe cap 116 having a shock absorbent bumper 117 mounted thereon is placed in the top of each pipe 115. A safety bar assembly 110 is located near each end of the motor mount rails 34, 35 as shown in FIG. 2, and in the event that a suspension rod 3 should fail, the bumbers 117 would stop and cushion the fall of the platform 2.

Referring again to FIG. 1, the platform 2 may be made of any suitable material, and in a preferred embodiment of my invention I employ a platform comprising a 4'×6' rectangular sheet of 1" thick plywood. An upward opening channel-like platform bracket 67 is bolted to each corner of the platform 2 for coupling the corners of the platform 2 to the vertical posts 20, 21, 22, 23 by suspension rods 3 in the manner hereinabove described. The height of the vertical posts 20, 21, 22, 23 and the lengths of the suspension rod assemblies are determined so that the platform 2 will not rest on the frame 4 or the safety bar assemblies 110 but will be swingingly suspended above the same.

Figure 7:
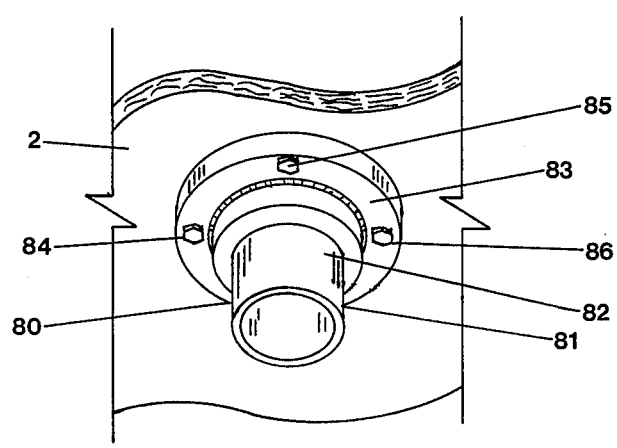
FIG. 7 is a view in perspective of a cam follower.

FIG. 7 illustrates a cam follower assembly 80 mounted to the bottom of the platform 2. In the illustrated embodiment, the cam follower comprises a cylindrical member 81 externally threaded at one end 82 for attachment to an internally threaded flange mounting 83 that is, in turn, attached by bolts 84, 85, 86, 87 to the bottom of the platform 2. In a preferred embodiment of my invention I employ a 2" O.D. pipe for the cylindrical member 81, which pipe is threaded and welded to a commercially available flange mounting 83. Commercially available hexagonal head bolts and nuts and commercially available washers are used to bolt the cam follower 80 to the bottom of the platform 2.

Figure 8:
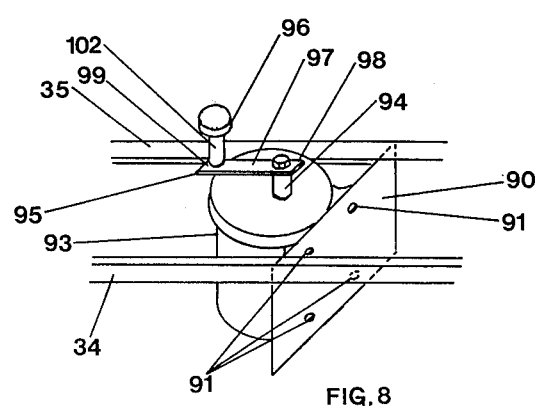
FIG. 8 is a view in perspective of a motor mounting assembly.

A vertical motor mounting plate 90 having a plurality of bolt holes 91 provided therethrough is mounted between and joined by welding or other suitable means to the motor mount rails 34, 35 as shown in FIG. 8. An electric motor 93 is vertically mounted by bolting to the motor mounting plate 90. In a preferred embodiment of my invention I use a 30 R.P.M. gear motor. A cam drive assembly 95 is coupled to the motor shaft 94. The cam drive assembly 95 comprises a cam 96 adapted to be slidably inserted into the downward opening cam follower 80 and a cam drive arm 97 comprising a steel plate adapted at one end 98 to be rigidly fixed to the shaft 94 of the drive motor 93 and adapted at the other end 99 to be coupled to the cam 96. The cam 96 is coupled to the drive motor 93 through the drive arm 97. Vertical separation between the cam 96 and the drive arm 97 is obtained by placing a spacer 102 between the cam 96 and the arm 97. During assembly of the swing support apparatus 1 of the present invention the cam 96 is inserted into the cam follower 80. As can be readily seen, operation of the drive motor 93 will cause the cam follower 80 to move in a circular motion about the vertical axis of the motor 93 as the follower 80 is driven by the drive arm 97 and cam 96. The platform 2, which is rigidly coupled to the cam follower 80 in the manner hereinabove described, will experience a swinging motion as the platform 2 is driven by the cam drive assembly 95, and the platform 2 will rise and fall as the suspension rods 3 swing back and forth and sideways from their rod support arms 46, 47, 48, 49.

Having thus described my invention, what I now claim is:

1. A swingable platform apparatus comprising a rectangular frame assembly adapted to stand on a floor and having a support post attached to and extending upward from each corner thereof wherein each of the said posts has mounted at the top thereof an inward extending support arm comprising a rectangular tubular member joined at one end to the said post and having attached to the other end thereof a downward opening channel bracket adapted to receive any of a plurality of like upper rod ends coupled thereto; a rectangular platform adapted to be suspended lengthwise of and above the frame assembly and adapted to receive a video game apparatus and an operator seat mounted thereon and adapted to support a video game apparatus, an operator seat, and an operator, and having bracket means attached thereto which bracket means are adapted to restrain and hold a video game apparatus and having an operator seat mounted thereon and having attached at each corner thereof an upward opening channel bracket adapted to receive any of a plurality of like lower rods ends coupled thereto; a plurality of like rod ends wherein each of the said rod ends is provided with an internally threaded barrel portion adapted to be coupled to a threaded end of a suspension rod and each of the said rod ends is swingably coupled by bolt means to one of the channel brackets; a plurality of like suspension rods, each rod having a plurality of right-hand threads at one end and a plurality of left-hand threads at the other end wherein each rod is adapted to be simultaneously coupled at one end to any of the upper rod ends and at the other end to any of the lower rod ends and is adapted to swingingly support a corner of the platform above the frame assembly; a downward opening cam follower assembly vertically mounted by bolt means to the bottom of the platform, comprising a cylindrical member externally threaded at the upper end thereof and adapted for attachment to an internally threaded flange mounting and an internally threaded flange mounting attached to the threaded end of the cylindrical member and attached by bolt means to the platform, which downward opening cam follower assembly is adapted to receive a cam slidably and removably inserted therein; motor mounting means mounted on the frame assembly and adapted to support a vertically positioned motor comprising a pair of parallel and elevated motor mounting rails joined at their ends to a lengthwise extension of the frame assembly and having provided therebetween a motor mounting plate adapted to receive a motor mounted thereto; a vertically oriented motor mounted to the motor mounting means and having extending out of the top thereof a motor shaft adapted to receive a cam drive arm attached thereto; coupling means for coupling the motor to the motor mounting means; a horizontally mounted cam drive arm attached at one end to the motor shaft and adapted at its other free end to be coupled to a cam vertically displaced from the horizontal plane of the cam drive arm by a spacer; coupling means for coupling the cam drive arm to the motor shaft; a cam spacer attached to the free end of the cam drive arm which cam spacer is adapted to vertically displace a cam above the horizontal plane of the cam drive arm; a cam mounted to and above the free end of the cam drive arm and adapted to be slidably and removably inserted into the downward opening cam follower; and coupling means for coupling the cam spacer and cam to the free end of the cam drive arm.

* * * * *